United States Patent [19]
Baran

[11] Patent Number: 5,247,591
[45] Date of Patent: Sep. 21, 1993

[54] METHOD AND APPARATUS FOR THE PRIMARY AND SECONDARY ROUTING OF FAX MESAGES USING HAND PRINTED CHARACTERS

[75] Inventor: Paul Baran, Atherton, Calif.

[73] Assignee: Interfax, Inc., Sunnyvale, Calif.

[21] Appl. No.: 596,058

[22] Filed: Oct. 10, 1990

[51] Int. Cl.$^5$ .............................................. H04N 1/24
[52] U.S. Cl. ....................................... 382/61; 382/46; 358/402; 358/440; 283/117
[58] Field of Search ................. 382/61, 11, 13, 46; 283/61, 62, 117; 209/3.3, 3.1; 358/440, 434, 403, 402; 235/494; 385/467

[56] References Cited

U.S. PATENT DOCUMENTS

| | | | |
|---|---|---|---|
| 3,558,859 | 1/1971 | Dilsner et al. | 382/61 |
| 3,995,741 | 12/1976 | Henderson | 209/3.3 |
| 4,180,798 | 12/1979 | Komori et al. | 382/14 |
| 4,187,520 | 2/1980 | Beduchaud et al. | 358/426 |
| 4,275,398 | 6/1981 | Siegal | 382/11 |
| 4,352,012 | 9/1982 | Verderber et al. | 358/498 |
| 4,776,464 | 10/1988 | Miller et al. | 209/3.3 |
| 4,893,333 | 1/1990 | Baran et al. | 358/468 |
| 4,924,078 | 5/1990 | Sant'Anselmo et al. | 235/494 |
| 4,941,170 | 7/1990 | Herbst | 358/440 |
| 4,978,145 | 12/1990 | Mikhail | 283/71 |
| 5,001,572 | 3/1991 | Hashimoto et al. | 358/440 |
| 5,059,775 | 10/1991 | Nakayama | 235/494 |
| 5,091,790 | 2/1992 | Silverberg et al. | 358/440 |
| 5,095,373 | 3/1992 | Hisano | 358/402 |
| 5,115,326 | 5/1992 | Burgess et al. | 358/440 |
| 5,133,026 | 7/1992 | Fujiwara et al. | 382/46 |

FOREIGN PATENT DOCUMENTS 62-272751 11/1987 Japan .

OTHER PUBLICATIONS

L. J. Gawron et al., "Scanned-Image Technologies Bring Ways to Conduct Business" *AT&T Technology*, vol. 6, No. 4, pp. 2-9.

*Primary Examiner*—Michael T. Razavi
*Assistant Examiner*—Steven P. Klocinski
*Attorney, Agent, or Firm*—Allston L. Jones

[57] ABSTRACT

The present invention includes an open-ended set of cover sheet forms that may be readily interpreted by the fax server system. In this system a first standardized cover sheet is designed to accept hand printed characters. This first cover sheet is then transmitted to a special fax server as part of this invention to create an alternative, fully detached cover sheet for automatic transmission to its specific recipient. Labor is minimized by allowing the sender to hand print a minimal amount of highly constrained telephone numbers, or the initials of the recipient onto a draft cover sheet when a mailing list has been previously stored in the memory associated with the special fax server. The first cover sheet is optionally automatically replaced by a second and final neatly printed cover sheet in which the abbreviated information is expanded using pre-stored information to provide sufficient information to allow the secondary fax message cover sheets to be routed by a human or a machine to be delivered to the intended recipient. The present invention acts as a bridge between today's manually prepared cover sheets and those capabilities found in E-mail systems that automatically route and store messages as well as processing other non-obvious features.

11 Claims, 11 Drawing Sheets

FIG. 3

SET UP MAILING LIST FORM

NAME OF MAILING LIST

NOTIFICATION OF THE ARRIVAL OF FAX MAIL

TO: JONES, JOHN J.   BOX #4322   415/323-5434

| ACTION | SUBJECT/CLIP AREA | FROM | DATE | MES-SAGE # | #PAGES | PRIVACY | STATUS |
|---|---|---|---|---|---|---|---|

| TO | | | | | | | |
|---|---|---|---|---|---|---|---|
| FROM | | | | | # OF PAGES | | |
| SUBJECT | | | | | | | |
| MESSAGE | | | | | | | |

METHOD AND APPARATUS FOR THE PRIMARY AND SECONDARY ROUTING OF FAX MESAGES USING HAND PRINTED CHARACTERS

CROSS REFERENCE

This application is related to co-pending U.S. Patent Application entitled "Dot Constrained Hand Printed Character Recognition System And Method" having Ser. No. 07/563,198, filed on Aug. 3, 1990, and U.S. Pat. No. 4,893,333 issued Jan. 9, 1990 entitled "Interactive Facsimile System And Method Of Information Retrieval" both of which are assigned to the same assignee as the present application.

FIELD OF THE INVENTION

This invention relates to the automatic routing of facsimile (fax) messages by automatically preparing fax routing sheets and to interfacing fax messages with electronic mail (E-mail).

BACKGROUND OF THE INVENTION

There are two categories of fax message routing, commonly called primary and secondary routing. Primary routing is the process whereby fax messages are sent directly to their final fax telephone number. Since many users share a common fax telephone number, a second, or secondary, level of routing is required to send the message to its correct shared device user. Primary routing of fax messages today is generally performed by either manually dialing telephone numbers, sometimes abbreviated by "speed dialing". Secondary routing is most commonly done manually, wherein the incoming cover sheet containing the name and organization of the intended recipient of the fax message is read by a human and the message is hand delivered by a messenger.

It is customary to use a pre-printed cover sheet as the first page of a multi-page facsimile message so that the message is delivered to its intended addressee, since many people tend to share a facsimile unit. Cover sheets are filled in with information such as the name, organizational name, telephone number of the sender, and the name and address of the intended recipient. Also, the number of pages to be sent is included to enable the recipient to determine if any pages are missing from the transmitted document.

Primary cover sheets are prepared automatically today when the message to be transmitted is created using a computer. For a fax message transmitted by MCI or E-mail, the computer will transmit an automatically prepared cover sheet.

Facsimile messages may be routed to end recipients sharing a single telephone number by the combined use of computer-added digital information in the header of fax messages generated by the computer and the manual use of touch-tone signal generation and the OCR reading of a cover sheet.

While the optical character reading of the cover sheet is known art, there are a number of limitations. Typewriting is required in most cases, since the state of the art of the reading of hand printed characters is presently limited.

SUMMARY OF THE INVENTION

In accordance with the preferred embodiment of the present invention there is disclosed an open-ended set of cover sheet forms that may be readily interpreted by the fax server system. In this system a first standardized cover sheet is designed to accept hand printed characters. This first cover sheet is then transmitted to a special fax server as part of this invention to create an alternative, fully automated detached cover sheet for automatic transmission to its specific recipient. Labor is minimized by allowing the sender to hand print a minimal amount of highly constrained telephone numbers, or the initials of the recipient onto a draft cover sheet when a mailing list has been previously stored in the memory associated with the special fax server. The major problem of constrained writing is that it is slow, so it is necessary to minimize the number of characters written.

The first cover sheet is optionally automatically replaced by a second and final neatly printed cover sheet in which the abbreviated information is expanded using pre-stored information to provide sufficient information to allow both primary routing to a specific telephone number or the secondary fax message cover sheets to be routed by a human or a machine to be delivered to the intended recipient.

The present invention acts as a bridge between today's manually prepared cover sheets and those capabilities found in E-mail systems that automatically route and store messages as well as processing other non-obvious features.

BRIEF DESCRIPTION OF THE FIGURES

FIG. 3 shows a form for the entry of a mailing list into the memory of the fax server.

DESCRIPTION OF THE PREFERRED EMBODIMENT

Figure 1:
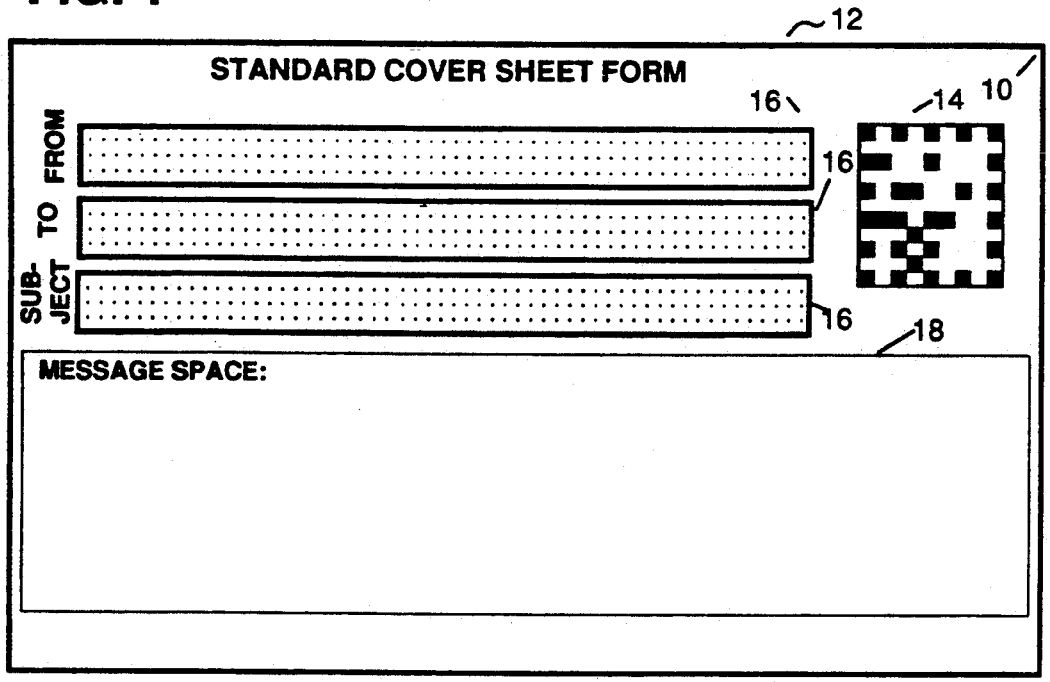
FIG. 1 shows one form of a standardized cover sheet 12 for use with the present invention.

FIG. 1 shows one form of a standardized cover sheet 12 for use with the present invention. The layout of this form is similar to an envelope and includes several features. In the upper right corner 10, in the location of a stamp on an envelope, is a binary coded form identification pattern 14. This pattern includes 63 binary interior bits in 9 rows of 7 columns with $2^{63}$ different combinations surrounded along each of the four edges of the identification pattern 14 by a single bit wide row or column of alternating black and white squares. These outer edge bits are provided to determine the orientation of a transmitted form since pages are often feed through a fax machine crooked and thus received skewed. With that many possible different forms, it is possible to permit each user to customize their own cover sheets. Also, if there are more forms that are desired than there are possible numbers, another row or column can be easily added to identification pattern 14 which will increase the number of possible form numbers by a factor equal to the number of the columns or rows in the direction that the pattern was not increased. This thus results in the number of form numbers being virtually open-ended.

Identification pattern 14, with its many possible designs, is very distinctive thus allowing each form layout to have its own identification pattern. Also, the identification pattern can be recognized by the receiving fax server regardless of its location on the form or whether the form is sent to the fax server either top edge or bottom edge first. To simplify and speed up the reading of each of the standard forms that can be developed, it is suggested that the identification pattern on each form be placed on each form in the same location. Thus, since the fax server expects to always find the identification pattern 14 in the same corner of each of the different types of cover sheets, the fax server will be able to determine if the transmitted cover sheet is right-side up or upside down upon examination of the location of pattern 14 on the received form given the expected location of the identification pattern 14.

The selection of a rectangular shape for identification pattern 14 with square bits provides two advantages to the rapid identification of the cover sheet 12 when it is received. One advantage is the ease with which the fax server can locate the identification pattern 14. A second advantage is that the use of square bits in identification pattern 14 will allow the fax server to size the overall document, or to correct for any horizontal or vertical distortions that might occur that make the square bits rectangular instead of square.

Cover sheet 12 also includes three fields 16 each designed to accept dot constrained hand printed characters, and a larger message field 18 along the bottom to accept typed or written messages. The technique of reading hand printed characters is described more fully in a co-pending U.S. Patent Application entitled "Dot Constrained Hand Printed Character Recognition System And Method" having Ser. No. 07/563,198, filed on Aug. 3, 1990, and assigned to the same assignee as the present application. The details of the invention of the co-pending application are incorporated herein by reference.

Figure 2A:
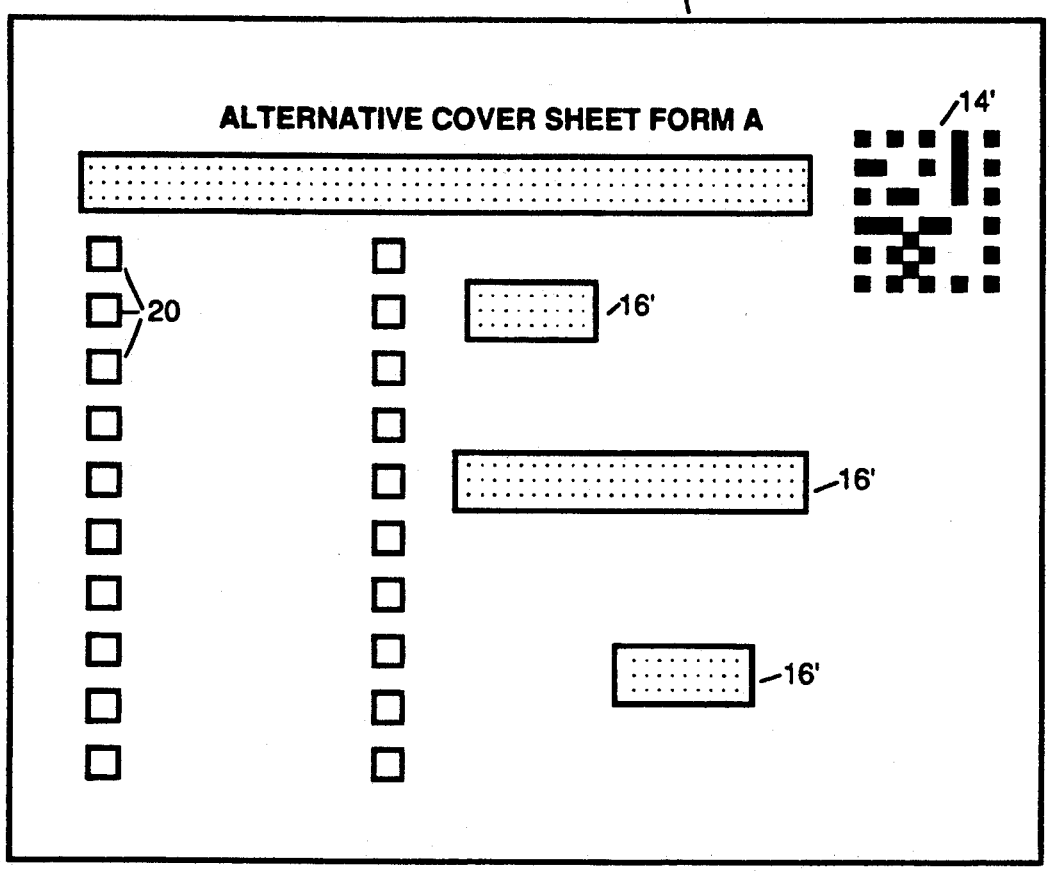
FIG. 2A shows an alternative cover sheet to that of FIG. 1.

Referring next to FIG. 2A there is an alternative cover sheet 12' which includes an identification pattern 14', dot constrained fields 16', and mark sense squares 20. Identification pattern 14' is in the same location as identification pattern 14 on cover sheet 12. Not only does identification pattern 14' identify the type of form transmitted to the fax server, it also identifies the location and type of each other field on the form for easy recognition by the fax reader subsystem of the fax server. For example, cover sheet 12' includes fields 16' to accept hand printed characters and mark sense squares 20 that may be filled in by the user. Various ones of the mark sense squares 20 could be used for the party transmitting the fax to select various services or special treatment that is desired, or the final receiving party. For example, each of mark sense squares 20 could be used for the user to identify whether the fax mail being sent is to be private, how long it is to be retained on the system, to whom a blind copy of the message should be sent, to select recipient(s) of the message from a predefined distribution list, or to select a standard stored message that may be timely to send to the named recipient.

Figure 2B:
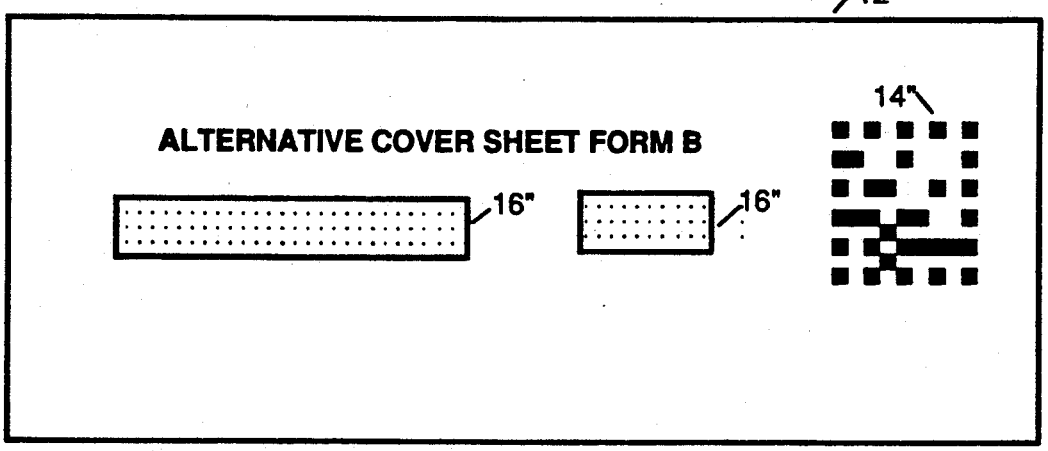
FIG. 2B shows another variant of the cover sheet of FIG. 1.

FIG. 2B shows another variant of the cover sheet 12" with a different form identification pattern 14" and two dot constrained character fields 16". With this form the areas of the form that are not within the fields 14" and 16" are available for conveying additional information, if desired. For example, the left field 16" could be used to designate a standard message prestored in the fax server that is to be sent to a recipient identified in the right most field 16".

In all cases the form identification pattern 14 identifies a unique form layout. This allows for the creation of a single basic standard while retaining the freedom to customize cover sheets for each user's application and avoids the need for an inflexible single standard for the format of the initial cover sheet.

As new forms are added, the software definition of each different form is then added to the fax server system. Depending of the scope of the service which the owner of a fax server wishes to offer, each user can either be required to use the set of forms that have been predefined by the owner of the fax server, or the user can b allowed to generate their own variety of cover sheets. In either case the system will probably be able to identify each of the forms from identification pattern 14 alone. However, if there are more forms on the system than the identification pattern will allow to be identified, the form identification can be performed by reading both the identification pattern and the "From" line for the identification of the user from the cover sheet.

The form identification pattern was shown as a bar code in FIG. 2b of U.S. Pat. No. 4,893,333, which is assigned to the same assignee as the present application. While other patterns can be used, it has been found that the checkerboard type pattern of the present invention is particularly suitable for applications where the form may be being read at an angle or upside down from the expected orientation. This arrangement provides the look and feel of a letter envelope where the checkerboard pattern 14 had the appearance of a stamp and the "To" and "From" blocks 16 are the addresses and the senders identification. Additionally, the checkerboard pattern is compact and readable even with distortions and noise found with today's facsimile transmissions.

Figure 3:
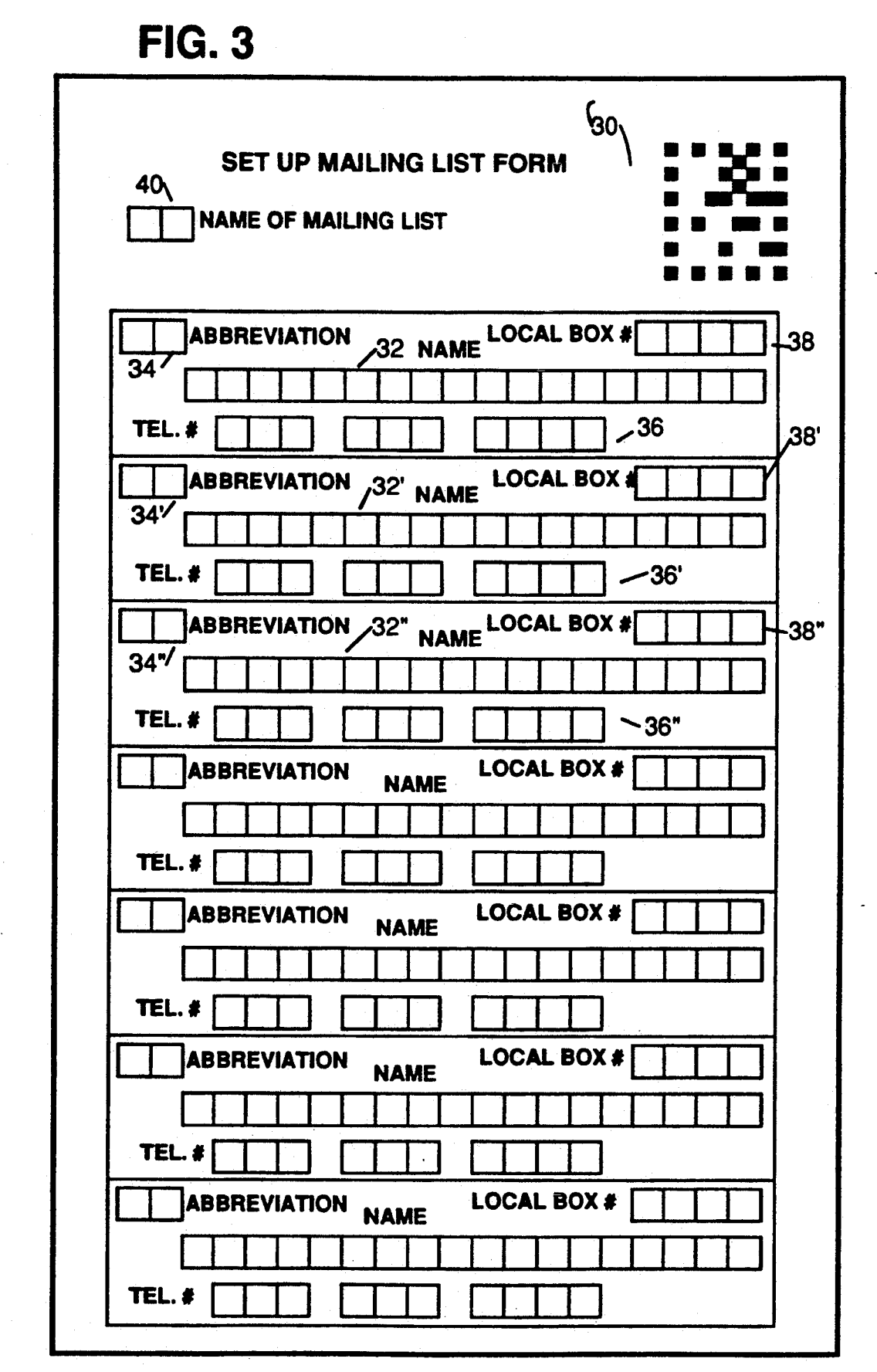

Although the identification pattern 14 has been discussed above with respect to various cover sheets, it also lends itself to the specification of a sheet that serves other functions, such as a sheet that is a communications vehicle between a user and a fax server, as seen in FIG. 3.

Referring to FIG. 3 there is shown a form for providing a mailing list 30 to be stored in the memory of the fax server with each mailing list that is created being associated with a particular user. When a user is accepted onto the fax server system they are permitted to input a private mailing list of as many names as permitted. Once the mailing list is entered into the system the amount of information that a user must provide on subsequent cover sheets is reduced, thus minimizing the amount of time necessary for the fax server to read and act on incoming fax messages. This is possible since abbreviations can be used in future transmissions, and since the number of characters to be read is fewer, the time to read the fax message is shorter.

Included in this form are fields to accept abbreviations for the name of a mailing list 40 that contains a series of name fields 32, 32', etc., each described by name abbreviations 34, 34', etc. Along with each name field 32, 32', etc. there is a telephone number field 36, 36', etc., and an extension or local box field 38, 38', etc. The inclusion of abbreviations 34, 34', etc., the user may use the abbreviations to route fax messages using standard cover sheets once the mailing list is provided so that the fax server can automatically convert the user inputed abbreviation into telephone numbers 36 and extensions 38 which are retained by the fax server from the previously read mailing list form 30. Given mailing list form 30, a user in subsequent messages to link with their previously entered mailing lists must either use the mailing list abbreviation or identify themselves on the cover sheet so that the fax server will utilize the prestored mailing list for that user.

Additionally, a user can add to, or delete from, their prestored mailing list by submitting a new form 30. If the abbreviation for the mailing list entry is one that had not been used before it is considered an addition and if the abbreviation was used before the earlier entry is overwritten thus allowing corrections to be made for changes of address, etc.

Figure 4:
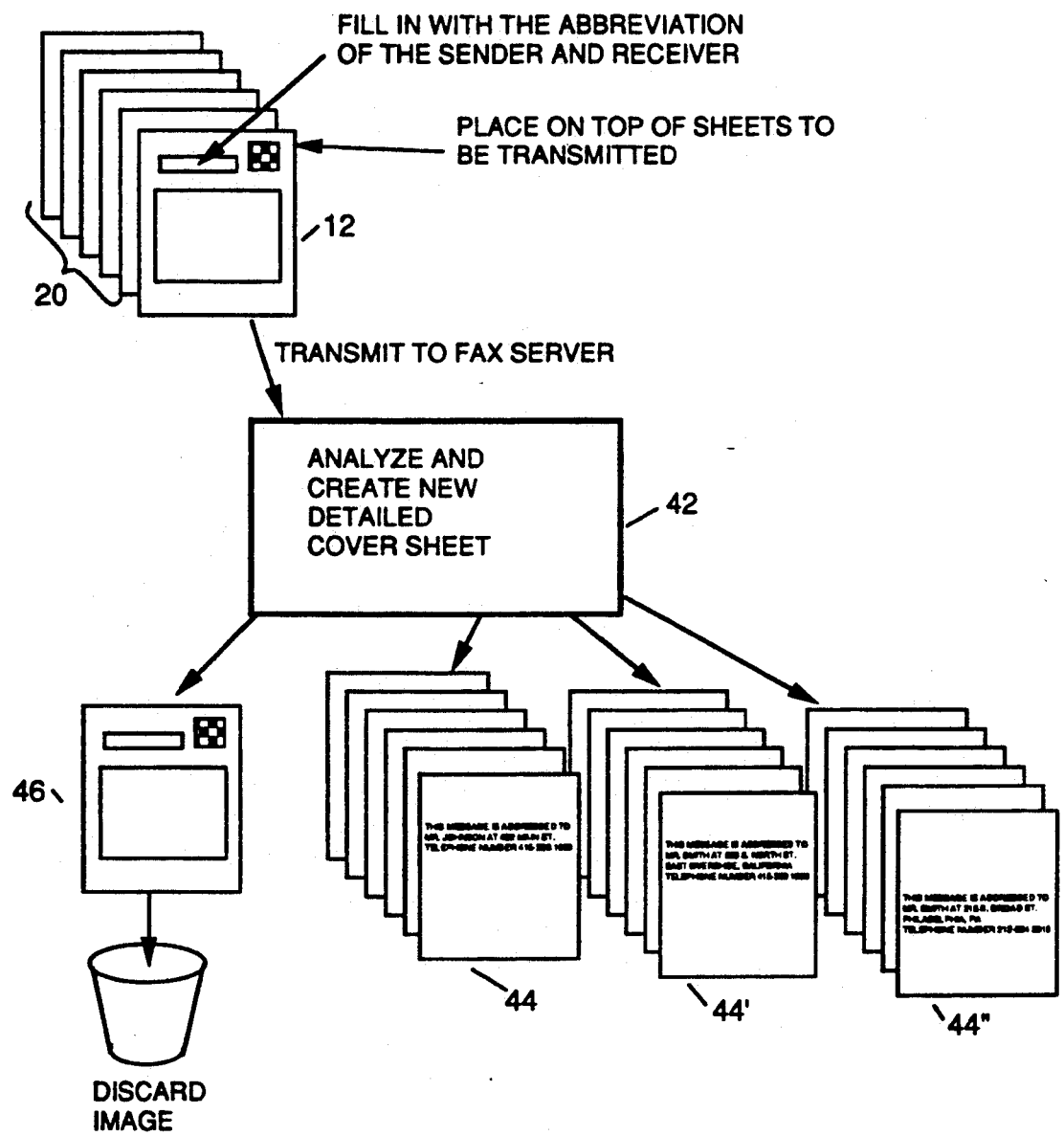
FIG. 4 shows a graphical representation of one function of the present invention.

FIG. 4 shows a graphical representation of one function of the present invention. Initially the user prepares a cover sheet by hand with their name or abbreviation of the desired mailing list of the "From" line and the abbreviations of the intended recipients on the "TO" line, perhaps one of those as shown in FIG. 1, and then places that sheet ahead of the document 20 to be transmitted. Fax server 42 reads cover sheet 12, converting identification pattern 14 to a character string that is used as the address to a look-up table when the format information of the cover sheet is stored. That format information is inputed to the processor for further analysis of the cover sheet. Following that, if document 20 is to be sent to several different parties on a mailing list, fax server 42 prepares those secondary cover sheets 44, 44', 44'', etc., and transmits them to the intended recipient followed by a copy of document 20. Then the received original, or the image of the, cover sheet 46 is discarded (e.g. erased from memory of fax server 42). To prepare the secondary cover sheets 44 with full names and telephone numbers, fax server 42 uses the information on an earlier transmitted mailing lists like that of FIG. 3 that has been stored in the memory of fax server 42. Though the use of a service which uses a fax server of the present invention a user having a low end fax machine without all of the optional features can have all of the features of the upper end fax machines, and then some, including abbreviated speed dialing to send messages to long mailing lists and deferred transmission on all messages on a message by message basis. The present invention thus also makes it possible for all fax users to take advantage of the least cost routing algorithms to minimize communications costs. Additionally, if the fax server is tied into a PBX system as discussed below with respect to FIG. 10, trunk charges can be reduced further since the fax server can be tied to an extension of the PBX system instead of to a dedicated trunk telephone line.

Figure 5:
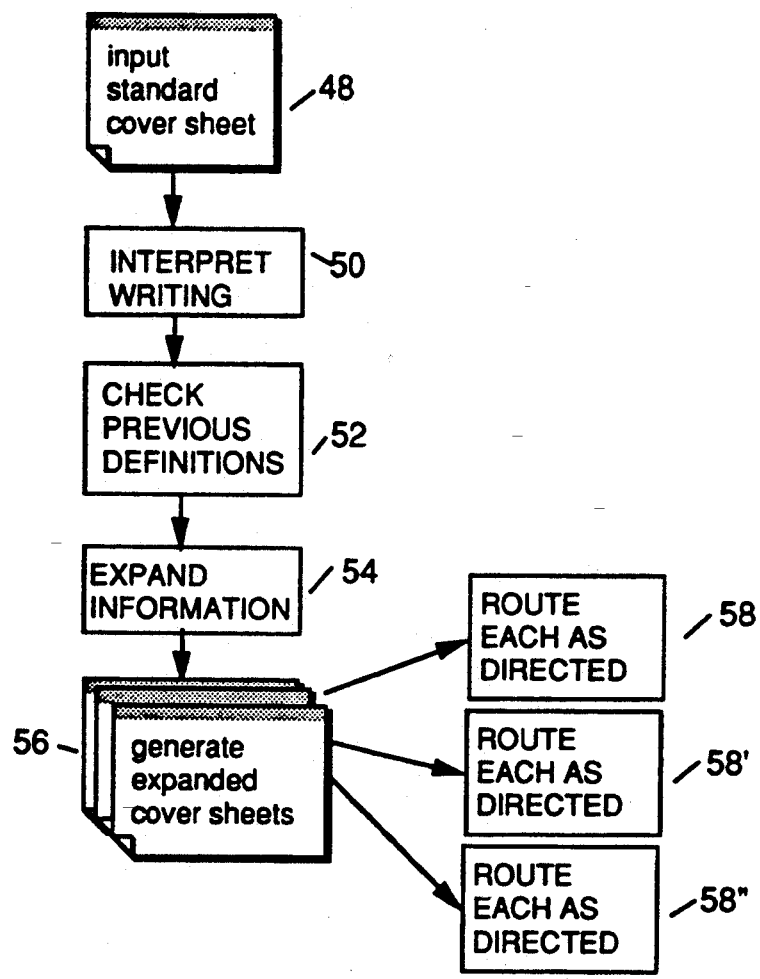
FIG. 5 is a flow chart that illustrates the "Analyze And Create" function of the fax server illustrated in block diagram form in FIG. 4.

FIG. 5 is a flow chart that illustrates the "Analyze And Create" function of the fax server 42 that is illustrated in block diagram form in FIG. 4. An input cover sheet 48 is received by fax server 42 and the handwritten information in fields 16 is interpreted by techniques described in the co-pending patent application entitled "Dot Constrained Hand Printed Character Recognition System And Method" having Ser. No. 07/563,198, filed on Aug. 3, 1990, and assigned to the same assignee as the present application. Then at block 52 fax server 42 checks its memory for previously stored mailing lists for any abbreviations that may have been included on cover sheet 48. Using those abbreviations together with that previously stored information, fax server 42 maps the abbreviations into the fax telephone numbers and names of the intended recipients (block 54), generates the necessary expanded cover sheets (block 56), and routes them with their associated document 20 to each of the intended recipients (blocks 58, 58', 58'', etc.) without human intervention.

Figure 6:
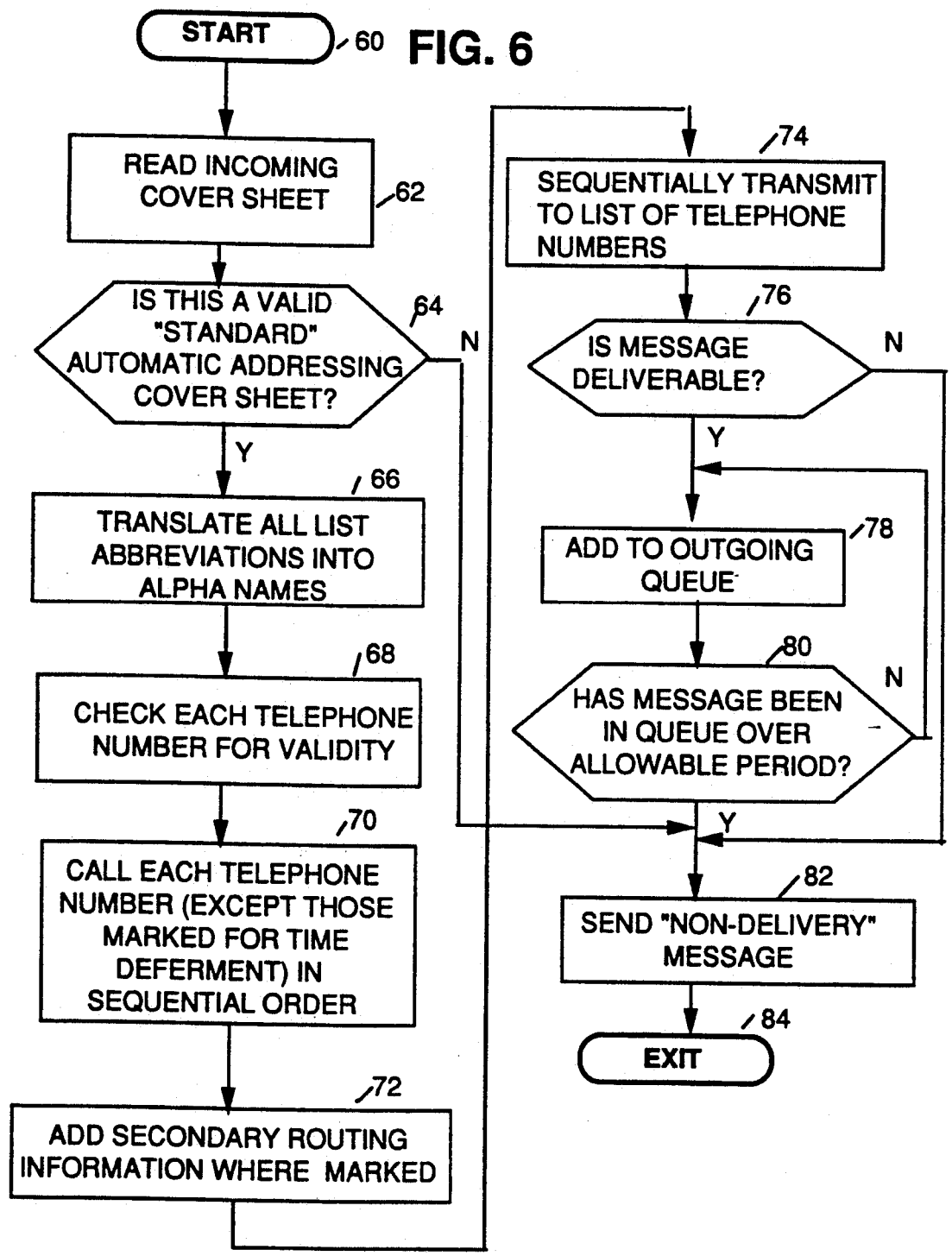
FIG. 6 is a flow chart that is more detailed than FIG. 5.

FIG. 6 is a more detailed flow chart than that shown in FIG. 5. Here, starting at block 60 the incoming cover sheet is read (block 62). Next, the received form is examined for the identification pattern 14 to determine if the cover sheet is a form which the fax server is programed to recognize (block 64). If it is not a recognizable form, then the process continues at block 82 where a "non-delivery message" is sent to the user using a prestored fax telephone number for the user followed by an exit from the routine. If the cover sheet is a recognizable form, the process continues at block 66 where all of the abbreviations used on the cover sheet are translated to complete alphabetic names using the prestored address lists in the fax server. Next, at block 68, each of the associated telephone numbers are checked for validity, and then the numbers are called either immediately or at a later stated time. At block 72 fax server 42 generates the secondary routing information electronically to be transmitted to the list of recipients which is done at block 74. Next the system tests the telephone line at block 76 to see if a the message is deliverable, i.e. is there a telephone company intercept when the number is dialed that indicates that the call will not go through. If the message is not deliverable, then the routine goes to block 82 and the routine continues as discussed above. If the message is deliverable, then the routine adds the message to the outgoing queue (block 78), and then the queue is tested to see if any message has been there more than the allowable maximum time. If it hasn't, it is routed back to the beginning of the queue. If it has been in queue more than the allowable time, then the routine continues at block 82 and the routine is exited at block 84. This is all accomplished automatically without human intervention.

Figure 7:
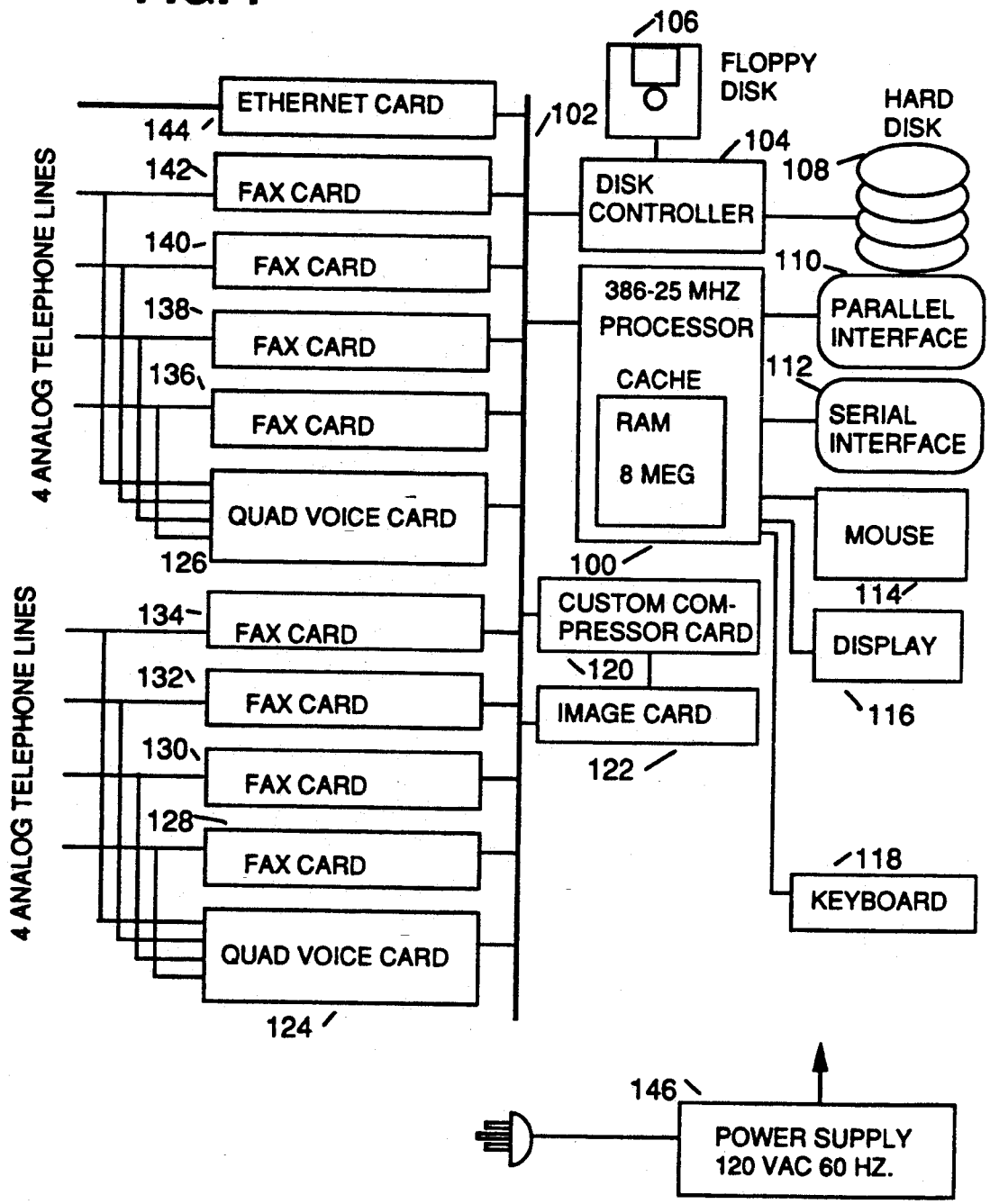
FIG. 7 shows a typical block diagram of a fax server with which the present invention can be utilized.

FIG. 7 shows the block diagram of a version of a fax server that can utilize all of the features of the present invention. The actual fax server for each implementation may be tailored for the actual application which may have as few as one fax line. The actual implementation shown here is built around a typical personal computer. The heart of the computer is processor 100 with a parallel interface 110, a serial interface 112, an optional mouse 114, a display 116 and a keyboard 118. Processor 100 interfaces with the remainder of the items shown by means of bus 102. Also coupled to bus 102 is a disk controller 104 which controls floppy disk 106 for inputing files and programs as necessary and a hard disk for storing data files and providing quick access to them. Custom compressor card 120 and image card 122 are provided to compress data for fax transmission and to decompress received fax data. Additional fax modems 128–142 are tied to bus 102 to provide multichannel fax capability with a quad voice board 124 and 126 for audio communication with a caller when there is a problem with the fax channel or if a caller accidentally calls a fax telephone number. The multiple fax cards also make it possible for processor 100 to send or receive the same or different messages at the same time. The last block shown in FIG. 7 is an Ethernet card 144 to tie the fax server into an E-mail system. Typical fax modem are made by Gammalink (CP cards) or by Hayes (JT fax), and a typical voice card is a Dialogic D40 quad voice card.

In the example system shown in FIG. 7, eight separate fax lines connect incoming and outgoing fax telephone lines to the overall fax server unit. Each telephone line terminates to a fax modem which converts the analog transmitted signals to their original digital patterns. Then the compressed digital data/image is expanded by the compressor card 120 and image card 122 into a full bit mapped image for analysis. After decompression, the expanded images are examined in processor 100 under the control of OCR software as described in the co-pending application and issued patent both cross-referenced above.

Figure 8:
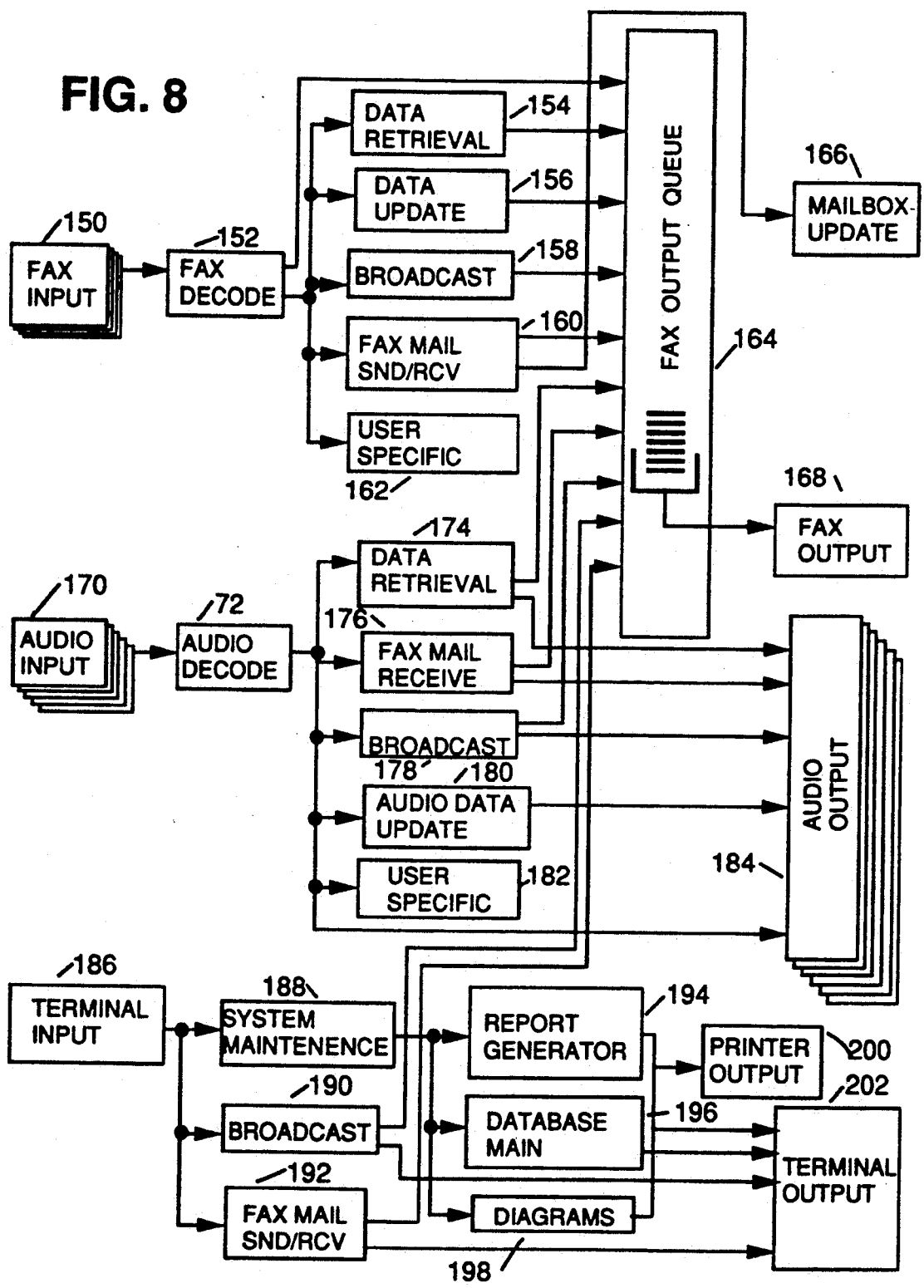
FIG. 8 is a simplified flow chart of the operation of the fax server in the mode of the present invention.

FIG. 8 is a simplified operational flow chart of the software operation of the fax server which illustrates the features of the present invention, as well as the prior art touch-tone input method. The system of FIG. 8 breaks down into three methods of input; fax input 150, audio (touch-tone) input 170, and direct terminal input 186. This permits the distant user to direct fax messages by using paper inputs, as described above, as well as touch-tone inputs, and the fax server operator to enter messages and control information directly without requiring machine reading of any images.

The focus of the present invention is upon fax messages received as manual paper input which the cover sheet is translated by machine readable means to create subsequent printed image messages. In FIG. 8 the incoming paper messages 150 are read by the fax decode 152 which decompresses (expands) the image. From decoder 152 the fax input is directed to a secondary operation depending on the purpose of the input. It may be provided for the purpose of retrieving data from or updating data in hard drive 108 (FIG. 7), to broadcast 158 the fax message to specified additional fax machines or fax-mail boxes, to receive or send a fax 160 as described with respect to the flow chart of FIG. 6, or for a user specific purpose 162. The output of decode 152 and operations 154–160 are also provided to a fax output queue 164 from which fax messages are used to update fax-mail boxes 166 or then transmitted 168 in accordance with the order the fax lines are free. In some cases, traffic is delayed to obtain lower cost transmission rates.

The audio input portion of FIG. 8 operates in a similar fashion to the fax input portion with the addition of the possibility of audio output 184. The direct input and control option is provided for system maintenance 188, as well as the broadcast 190 and fax mail send and receive 192 options. Each of these options also can produce an output on the terminal 202, with the system maintenance option having the capability of generating a report 194, maintaining the database 196, and the generation of diagrams, each of which can be directed to a printer 200 or the terminal 202 for display.

Figure 9:
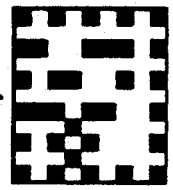
FIG. 9 represents a form to present the status of received fax mail to a fax mail box user.

The present invention opens a range of new capabilities demonstrated by fax mail form 204 shown in FIG. 9. If the fax server includes an Ethernet card 144, as shown in the block diagram of FIG. 7, the fax user can have access to fax mail (E-mail) generated and read by computer. Additionally, Ethernet card 144 also makes it possible to tie the fax mail system of the present invention into an existing E-mail system to totally automate the sending of E-mail messages in a secondary stage as was described above for sending secondary fax messages using a single input cover sheet and perhaps a following document that is to be transmitted to numerous parties. Form 204 is sent to a box holder on a particular fax server system when fax mail is received and stored in the box holders box on that system with form 204 presenting the status of received fax mail to the fax mail box holder. The fax server of the present invention translates a minimum amount of input information to create form 204 with essentially the same look and feel for fax mail as is provided by current E-mail systems which require keyboard inputs to generate a similar status report.

Additionally, if the sender has a pre-stored name abbreviation on the fax server this could be shown on form 204 as well. The date and time of each fax transmission is determined by the fax server system, as is the sequential message number, and the number of pages transmitted. Privacy requests initiated by the fax mail sender are indicated by a mark in the privacy column, and the status column indicates whether the message has previously been read by the recipient, or perhaps an indication that the message is to be permanently filed and not to be destroyed. The control input arrangement is by writing a letter in the action column. Allowable action items might include:

A = Acknowledge; send a return acknowledgement that the message has been received, or read;

S = Save; retain this message;

D = Duplicate this message and send it to the following people . . . ;

R = Reply; in the space below;

E = Erase; erases the copy of the fax from memory; or

P = Privacy; invoke privacy on the incoming message (Requires the use of a password for interpretation).

Form 204 can also be used as a cover sheet to send messages, thus there are separate columns for "To" and "From" fields, as well as a field labeled "Subject". There are two approaches to the labeling of the message subject matter. The first is the use of machine readable fields, in which constrained lettering is used. The second approach is the use of "clipping" wherein the image field is duplicated and printed out in the "Clip Area". Either of these two approaches can be used in this application.

Figure 10:
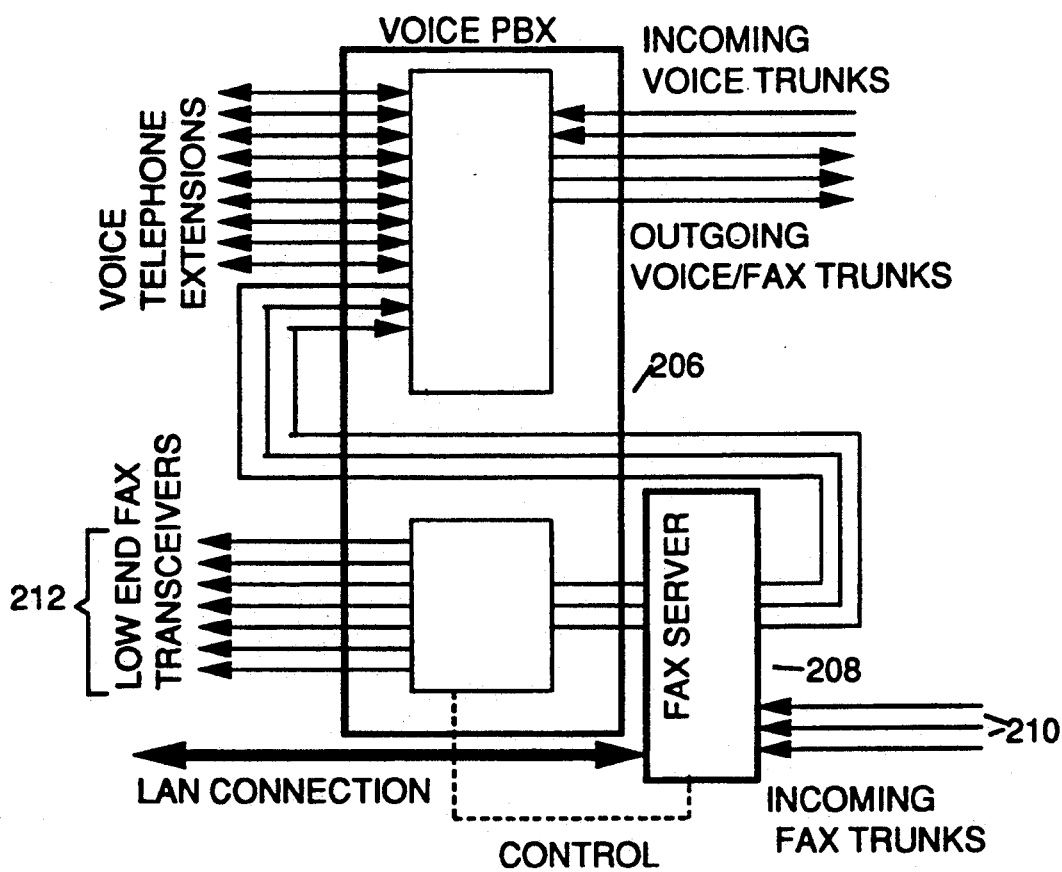
FIG. 10 is a block diagram that illustrates the connection of the described fax server to a conventional voice PBX.

Referring next to FIG. 10 the connection of the described fax server 208 to a conventional voice PBX 206 is shown in block diagram form. The invention is supported for both inward (primary) 210 or secondary 212 routing which allows fax machines to be connected as extensions on the PBX rather than tying up full period trunks. When the locally connected fax machine (lines 212) goes off hook, its presence on the line triggers the PBX 206 to connect that extension to fax server 208. The fax traffic is buffered and the hand printed cover sheet is then read. The new outgoing cover sheet is prepared and replaces the hand printed cover sheet, allowing PBX 206 to provide such features as minimum cost routing and shared outgoing trunks with the heavier cross section voice carrying trunks.

If incoming traffic had been generated by a fax server 208 using this invention, then it would be accepted and routed to its target extension fax printer via lines 212. Additional features could also be supported, such as dialing the voice telephone of the end user informing him or her by use of a prerecorded message that a fax message is awaiting receipt.

Figure 11:
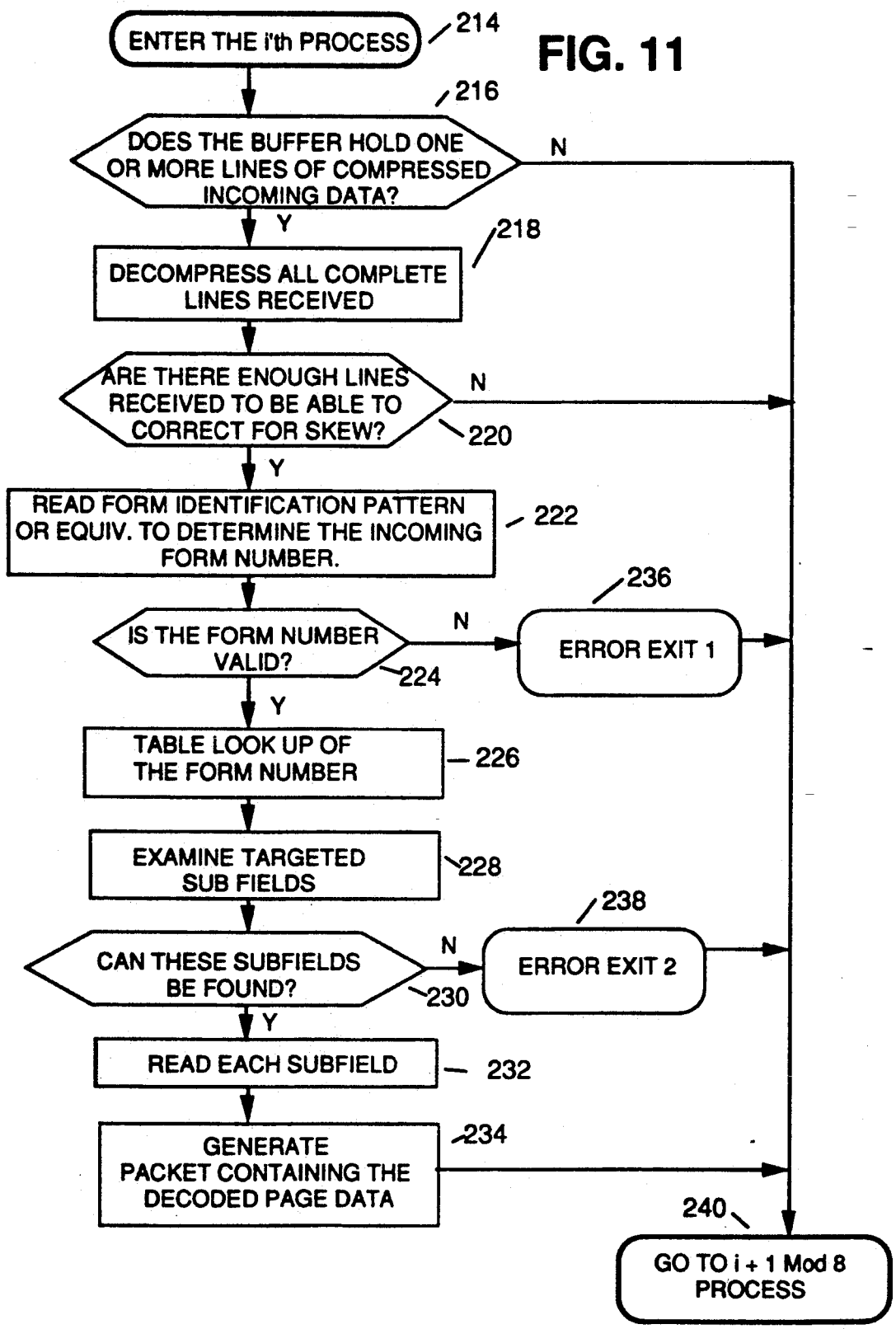
FIG. 11 is a sub-routine for checking the validity of an identification pattern of a received form and to load the form identification format into the fax server for automatic reading of the received form.

Lastly, FIG. 11 is a flow chart for a subroutine for checking the validity of an identification pattern 14 of a form received by the fax server and to load the form identification format into the fax server for automatic reading of the received form. Block 214 is the start of the $i^{th}$ process of the subroutine with block 216 indicating the test for the buffer holding one or more lines of compressed incoming data. If it does not, then the process goes to the i+1 mod 8 process for the next line of data (block 240). If the buffer has one or more lines of compressed data then the data is decompressed (block 218) and tested for whether or not there are enough lines to correct for skew of the received document, if any (block 220). If there are not enough lines, then the process goes to block 240, if there are enough lines then the process continues at block 222 where the form identification pattern 14 is read to determine the form number of the received form. Following identification of the form number, that number is tested to determine if it is a valid form number on the receiving fax server system (block 224). If it is not a valid number, then an error exit 1 is generated (block 236) and the process continues at block 240. If the number is a valid number, a look-up table is consulted (block 226) and the subfields of that form as recorded are examined (block 228). Next, a test is performed as to whether or not those subfields can be found on the received document (block 230). If those subfields can not be found, an error exit 2 (block 238) is generated and the process continues at block 240. If those subfields are found, each subfield is read (block 232) and a packet containing the decoded page data is generated (block 234) and the process continues at block 240.

While this invention has been described in several modes of operation, it is contemplated that persons reading the preceding descriptions and studying the drawings will realize various alterations and modifications. It is therefore intended that the following appended claims be interpreted as including all such alterations and modifications as fall within the true spirit and scope of the present invention.

What is claimed is:

1. A family of N different machine recognizable fax data sheets to be read automatically by a receiving fax server wherein each of said N different fax data sheets individually instructs said fax server as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets, wherein said at least one preprinted information receiving area includes:

a first data receiving area being a constrained field for receiving hand written characters that designate the source of said fax data sheet; and a second data receiving area being a constrained field for receiving hand written characters that designate the destination of a message on said each fax data sheet;

a unique preprinted machine readable identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets; and a third data receiving area for receiving a message to be automatically secondarily transmitted to the destination identified in the second data area;

wherein N is a positive integer of a least 2.

2. A family of fax data sheets as in claim 1 wherein said third data receiving area is constrained to receive a hand written message.

3. A family of fax data sheets as in claim 1 wherein said third data receiving area is unconstrained to receive a clipped message.

4. A family of N different machine recognizable fax data sheets to be read automatically by a receiving fax server wherein each of said N different fax data sheets individually instructs said fax server as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets, wherein said at least one preprinted information receiving area includes a first data area for individually naming said each fax data sheet to serve as a pointer to memory locations of the fax server where the information recorded on said each fax data sheet is stored, and a plurality of identical second data areas for user entry of a name, a fax telephone number, and a name abbreviation in corresponding subfields to create a personalized mailing list for storage in the fax server; and a unique machine readable preprinted identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets;

wherein N is a positive integer of at least 2.

5. A family of fax data sheets as in claim 4 wherein each of said plurality of second fields further includes a subfield for entry of a fax mail box number.

6. A family of N different machine recognizable fax data sheets to be read automatically by a receiving fax server wherein each of said N different fax data sheets individually instructs said fax server so as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets, wherein said at least one preprinted information receiving area includes a first data area containing the name, box number and fax telephone number of a fax mail user, and a second data area containing a first plurality of lines each divided into a second plurality of columns to report to the user identified in said first area the arrival and status of fax mail messages on the fax server system for that user; and a unique preprinted machine readable identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets;

wherein N is a positive integer of at least 2.

7. A method for the automatic secondary routing of fax messages with a fax server, the method comprising the steps of:

a. storing in said fax server the layout and format of each preprinted fax data sheet of a family of N different machine recognizable fax data sheets, each of said fax data sheets defining thereon at least one preprinted information receiving area having a preselected location and format that corresponds with a particular one of said N different fax data sheets and a unique machine readably preprinted identification pattern that corresponds to a particular one of said N different fax data sheets for automatic identification, wherein each of said identification patterns is keyed to the location, format and definition of the processing of the at least one preprinted information receiving area of the corresponding fax data sheet of said family of fax data sheets, wherein N is a positive integer of at least 2, and said at least one preprinted information receiving area is disposed to receive information indicative of the identity of the intended recipient of a fax message for secondary routing which has been entered, wherein said unique identification pattern is selected from a family of N such patterns, with each of said N patterns including a binary pattern of n rows and m columns of bits with a total number of combinations equal to $2^{nm}$ wherein n and m are each positive integers of at least 1, and a one bit wide edge of an alternating bit pattern surrounding said interior binary pattern to determine the orientation of the data sheet when received by the fax server;

b. completing a selected preprinted fax data sheet from said family of N different machine recognizable fax data sheets;

c. transmitting said completed fax data sheet of step b. via a fax machine to the fax server;

d. said fax server generating an electrical signal corresponding to said unique machine readable identification pattern on said transmitted fax data sheet;

e. said fax server decoding the location and format of said at least one preprinted information receiving area by means of the electrical signal of step d. with step e. including the steps of f., g. and h. as follows:

f. determining the orientation of the transmitted fax data sheet by identifying the location of the unique identification pattern on the transmitted fax data sheet;

g. reorientating the transmitted fax data sheet using the information of step f.; and h. generating a serial bit stream representative of the unique identification pattern by reading the reoriented unique identification pattern left to right, top to bottom for identification of the format and layout of said transmitted data sheet by said fax server;

i. said fax server reading the data entered into said at least one preprinted information receiving area;

j. said fax server automatically identifying the fax telephone number of the intended recipient using the information entered in step b. on the transmitted fax data sheet;

k. transmitting the message for secondary routing to said fax server;

l. formatting the message for secondary routing to the identified recipient;

m. delivering the message for secondary routing to the intended recipient; and n. sizing the transmitted fax data sheet to the size of the stored fax data sheet having the same unique identification pattern as the transmitted fax data sheet by comparing the size relationship between the bits of the binary unique identification pattern on the transmitted fax data sheet and the known size of the bits of the unique identification pattern on the corresponding stored fax data sheet.

8. A method for the automatic secondary routing of fax messages with a fax server, the method comprising the steps of:

a. entering information on a fax mailing list data sheet containing a first data area for individually naming said mailing list data sheet to serve as a pointer to memory locations of the fax server where the information entered on the mailing list data sheet is stored, and a plurality of identical second data areas for user entry of a name, a fax telephone number, and a name abbreviation in corresponding subfields to create a personalized mailing list for storage in the fax server;

b. transmitting the completed mailing list of step a. to the fax server;

c. said fax server decoding the transmitted mailing lists;

d. said fax server storing said decoded mailing list of step c. in the memory of the fax server;

e. completing a selected preprinted fax data sheet from a family of N different machine recognizable fax data sheets, each of said fax data sheets defining thereon at least one preprinted information receiving area having a preselected location and format that corresponds with a particular one of said N different fax data sheets and a unique machine readable preprinted identification pattern from a family of N such patterns, one such pattern for each of said N different fax data sheets, wherein each of said identification patterns corresponds with a particular one of said N different fax data sheets and is keyed to the location, format and definition of the processing of the at least one preprinted information receiving area of the corresponding fax data sheet of said family of fax data sheets, wherein N is a positive integer of at least 2, and said at least one preprinted information receiving area is disposed to receive information indicative of the identity of the intended recipient of a fax message for secondary routing which has been entered;

f. transmitting said completed fax data sheet of step e. via a fax machine to the fax server;

g. said fax server generating an electrical signal corresponding to said unique machine readable identification pattern on said transmitted fax data sheet;

h. said fax server decoding the location and format of said at least one preprinted information receiving area by means of the electrical signal of step g;

i. said fax server reading the data entered into said at least one preprinted information receiving area;

j. said fax server automatically identifying the fax telephone number of the intended recipient using the information entered in step e. on the transmitted fax data sheet;

k. transmitting the message for secondary routing to said fax server;

l. formatting the message for secondary routing to the identified recipient; and m. delivering the message for secondary routing to the intended recipient.

9. A family of N different machine recognizable fax data sheets to be read automatically by a receiving fax server wherein each of said N different fax data sheets individually instructs said fax server as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets;

a unique preprinted machine readable identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets, wherein each of said unique identification patterns is selected from said family of N patterns, wherein each of said N patterns includes an interior binary pattern of n rows and m columns of bits with a total number of combinations equal to $2^{nm}$ where n and m are each positive integers of at least 1; and a plurality of information receiving areas the location and data type of which are user definable for a countable number of the unique identification patterns that are reserved for said user;

wherein N is a positive integer of at least 2.

10. A family of N different machine recognizable fax data sheets to be read automatically by a receiving fax server wherein each of said N different fax data sheets individually instructs said fax server as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets, and includes a constrained data entry field for entering handwritten data to be read by the receiving fax server to name a document to be transmitted following the received fax data sheet; and a unique preprinted machine readable identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets;

wherein N is a positive integer of a least 2.

11. A family of N different machine recognizable fax data sheets to be read automatically by a receiving fax server wherein each of said N different fax data sheets individually instructs said fax server as to the layout, format and processing of the data at each data location included in that fax data sheet, each of said fax data sheets comprising:

a web for receiving information to be transmitted to said receiving fax server;

at least one preprinted information receiving area on said web having a preselected location and format that corresponds with a particular one of said N different fax data sheets including an unconstrained data entry area for responding to inquiries; and a unique preprinted machine readable identification pattern from a family of N such patterns, one such pattern for each of said N different fax data sheets, wherein each of said identification patterns corresponds with a particular one of said N different fax data sheets and is keyed to the location, format and definition of the processing of said at least one preprinted information receiving area of the corresponding fax data sheet of said family of fax data sheets;

wherein N is a positive integer of at least 2.

* * * * *